Sept. 14, 1937. J H. HUNT ET AL 2,092,975
DOUBLE DISK WHEEL
Filed June 19, 1933 3 Sheets-Sheet 1
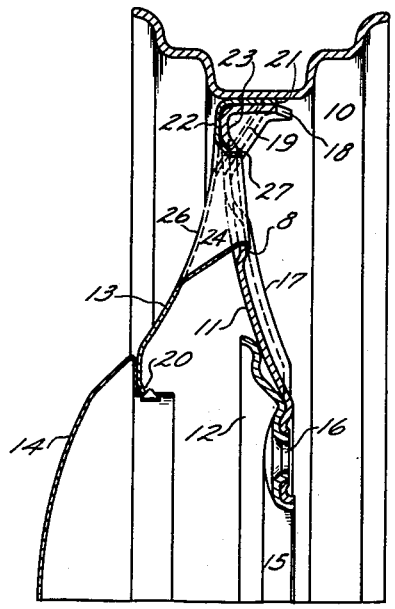
FIG. I
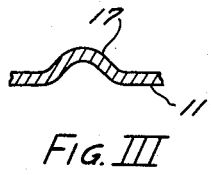
FIG. III
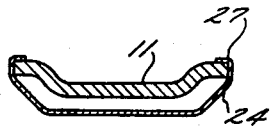
FIG. IV
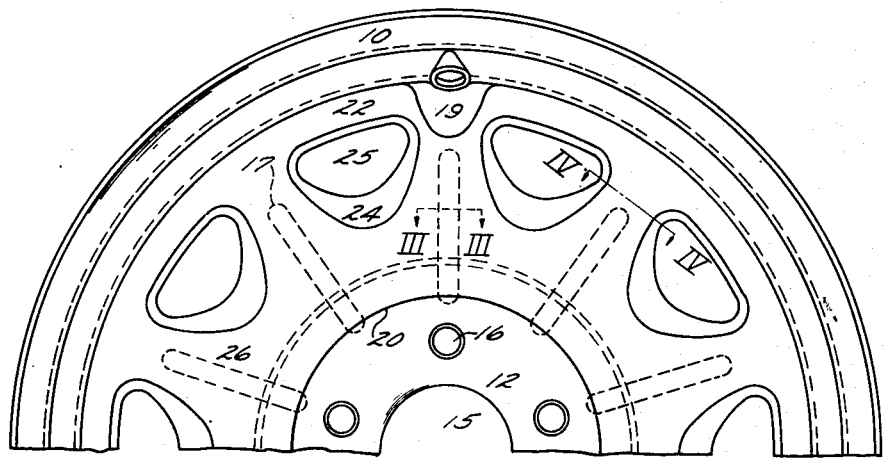
FIG. II
INVENTOR.
J HAROLD HUNT.
AND
BY HARRY J. HORN.
Carroll R. Taber
THEIR ATTORNEY.

Sept. 14, 1937. J. H. HUNT ET AL 2,092,975
DOUBLE DISK WHEEL
Filed June 19, 1933 3 Sheets-Sheet 2
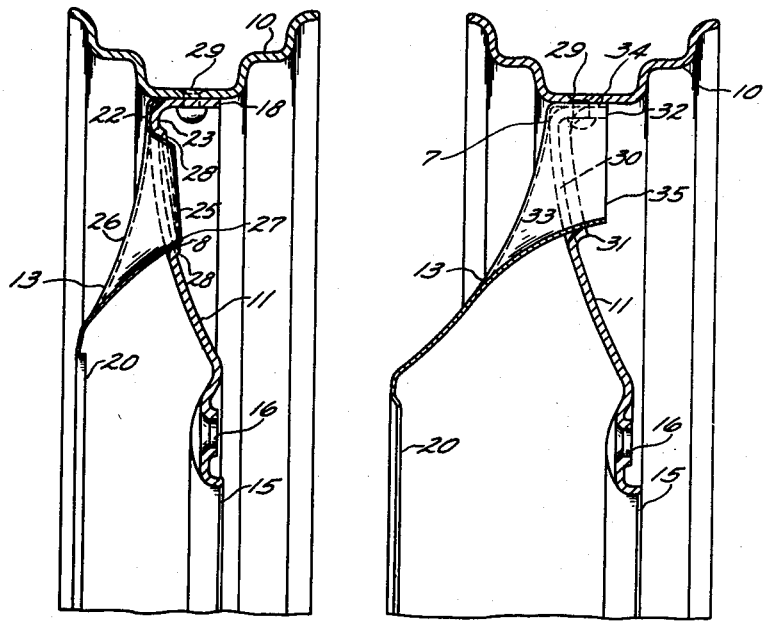
FIG. V   FIG. VI
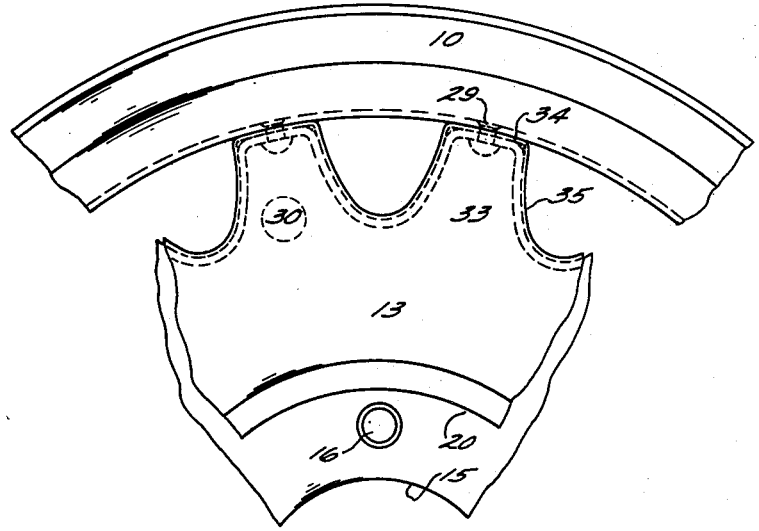
FIG. VII
INVENTOR.
J HAROLD HUNT
AND
BY HARRY J. HORN
Carroll R. Jaber
THEIR ATTORNEY.

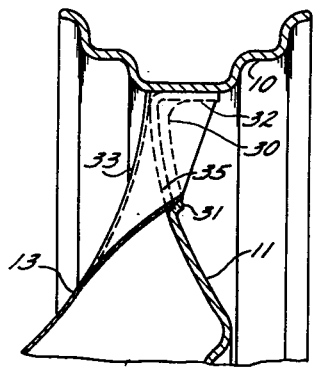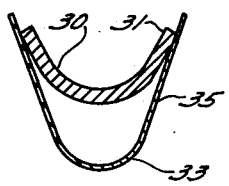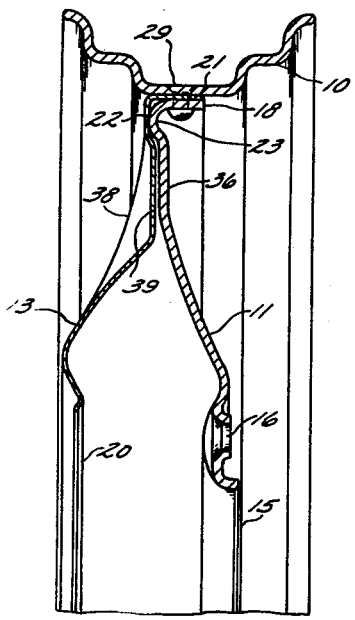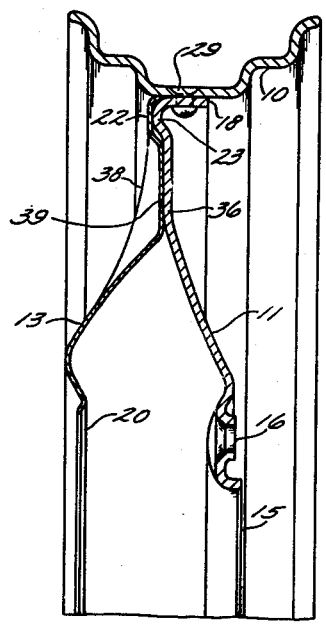

Patented Sept. 14, 1937

2,092,975

UNITED STATES PATENT OFFICE 2,092,975

DOUBLE DISK WHEEL

J Harold Hunt and Harry J. Horn, Lansing, Mich., assignors to Motor Wheel Corporation, Lansing, Mich., a corporation of Michigan Application June 19, 1933, Serial No. 676,492

4 Claims. (Cl. 301—37)

This invention relates to pressed metal wheels of the double disk type wherein one of the disks serves primarily as a load supporting element and the other disk serves primarily as a decorative element.

In the prior art devices decorative disks are conventionally treated as accessories and are removably secured to the wheel bodies or the wheel rims with which they are associated. The present invention has for its principal object the provision of a vehicle wheel including as a unitary part thereof a decorative disk permanently and rigidly connected to a conventional load supporting disk. It is also an object of the invention to provide simple and inexpensive means for securing the decorative disk to the load supporting disk and for securing one or both of the disks to the wheel rim whereby to eliminate all objectionable noise due to the relative movement of the disks with respect to each other.

One of the principal advantages of the double disk wheel embodying the present invention consists in the flexibility of its design. Various forms of decorative covers may be combined with a standard load supporting disk. The decorative covers are preferably made of relatively light weight metal which may be pressed to any desired contour. Thus in order to provide a wheel which harmonizes with the general appearance of the vehicle on which it is used, it is only necessary to combine a decorative cover of suitable design with a standard load supporting disk.

Various embodiments of the present invention are illustrated in the accompanying drawings wherein:

Figure I is a partial cross sectional view of a double disk wheel having a plurality of circumferentially spaced apart registering openings formed in the disks adjacent their peripheries;

Figure II is a partial front view in elevation of the wheel illustrated in Figure I;

Figure III is a cross sectional view taken on substantially the line III—III of Figure II;

Figure IV is a cross sectional view taken on substantially the line IV—IV of Figure II;

Figure V is a partial cross sectional view of a modified form of the vehicle wheel illustrated in Figures I and II;

Figure VI is a partial cross sectional view of a double disk wheel in which the disks are provided with corresponding radially extending spoke-like arms separated at their outer extremities;

Figure VII is a partial front view in elevation of the wheel illustrated in Figure VI;

Figure VIII is a modified form of the wheel illustrated in Figures VI and VII;

Figure IX is a sectional view through the radially extending arms of the two disks forming a part of the wheel illustrated in Figure VIII;

Figure X is a partial cross sectional view of a double disk wheel wherein the body portions of the two disks are imperforate; and Figure XI is a partial cross sectional view of a modified form of the wheel illustrated in Figure X.

The vehicle wheel illustrated in Figures I, II, III and IV consists of a rim 10, a load supporting disk 11, a reinforcing member 12, a decorative disk 13, and a removable hub cap 14. The rim 10 may be of any conventional form and is here shown as of the standard drop center type. The load supporting disk 11 is provided with a central opening 15 through which a wheel axle and hub assembly extends when the wheel is mounted upon the hub.

The reinforcing member 12 is provided to strengthen the load supporting disk 11 adjacent its central portion. The reinforcing member 12 is preferably secured to the disk 11 by the complementary formation of these two parts which are provided with suitable circumferentially spaced apart openings 16 adjacent the central opening 15 for the reception of standard stud bolts utilized in securing the wheel to a hub flange.

The disk 11 is provided with a plurality of radially extending stiffening ribs 17 and with a plurality of circumferentially spaced apart openings 18 adjacent its periphery intermediate the stiffening ribs. A laterally extending peripheral flange 18 is formed at the periphery of the disk 11. A well or depression 19 is formed in the periphery of the disk to accommodate the valve of a pneumatic tire.

The outer decorative disk 13 is of substantially frusto-conical form having a relatively large central opening 20. An axially extending flange 21 is provided at the periphery of the disk 13. Inwardly of the axially extending flange 21 the disk 13 has an annular radially extending peripheral portion 22 corresponding to a similar portion 23 of the disk 11. The disk 13 is here shown as having a plurality of radially extending spokelike ribs 26. The surface of the disk is depressed intermediate the spoke portions 26 as indicated at 24. Openings 25 are formed at the innermost extremities of the depressions.

The openings 25 are of proper size and suitably spaced to register with the openings 8 in the load supporting disk 11.

The disks 11 and 13 are assembled as indicated in Figure I with the peripheral portions 22 and 21 of the disk 13 contacting the corresponding peripheral portions 23 and 18 of the inner disk 11 and with the central portions of the disks spaced axially from each other. The edge portions 27 of the disk 13 defining the openings 25 therein project through the openings 8 in the disk 11 when the disks are assembled as just described. These projecting edge portions are preferably bent laterally against the inner surface of the disk 11 as clearly shown in Figures I and IV.

After the disks 11 and 13 have been assembled they are preferably secured to the rim 10 by means of rivets, not shown, which project through the base of the rim and the flanges 21 and 18 of the disks 13 and 11. The close contact between the peripheral portions of the disks 11 and 13 and the relation of the edge portions 27 of the disk 13 to the inner surface of the disk 11 serve to hold the two disks in rigid relation to each other. The rivets passing through the base of the rim 10 and the flanges 18 and 21 serve to permanently and rigidly fasten the disks to the rim.

The double disk wheel is detachably mounted upon a wheel hub by securing the inner disk 11 to a hub flange in the usual manner. The central opening 20 in the outer disk provides access to the securing bolt openings 16 formed in the central portion of the disk 11. After the wheel has been mounted on a wheel hub the removable hub cap 14 is inserted into the opening 20 to conceal the securing means and provide the desired appearance for the outside of the wheel.

The general outer appearance of the wheel illustrated in Figure V is substantially the same as the wheel shown in Figures I and II but the construction and arrangement of the parts are somewhat different. The load carrying disk in this form of the invention does not include strengthening ribs similar to those illustrated in Figure I. No reinforcing plate is employed to strengthen the central portion of the disk. The disk 11 is of conventional design having a central opening 15, securing bolt openings 16 and an axially extending peripheral flange 18.

The outer disk 13 forming a part of the wheel illustrated in Figure V is similar to the outer disk shown in Figure I except that it does not have an axially extending peripheral flange. It does include a central opening 20, radially extending spoke portions 26, and a plurality of circumferentially spaced apart openings 25 adapted to register with similar openings 8 in the disk 11.

The disks 11 and 13 are assembled with the edges 27 of the disk 13 defining the openings 25 therein projecting through the openings 8 in the disk 11 and with the corresponding annular peripheral portions 23 and 22 of the disks contacting each other. The two disks are preferably rigidly fastened together by welding the radially extending annular peripheral portion 22 of the disk 13 to the corresponding portion 23 of the disk 11. The edge portions 27 of the disk 13 about the openings 25 may also be welded to the edge portions 28 which define the openings 8 in the disk 11. If desired, the welding of the portion 22 to the corresponding portion 23 may be dispensed with in which case the welds between the edges 27 and 28 will serve as the sole means for fastening the disks together.

The disk 11 is secured to the rim 10 in the usual manner by means of rivets 29. Any suitable form of removable hub cap may be used to close the opening 20 in the disk 13 after the wheel has been mounted on a wheel hub.

The modified construction illustrated in Figures VI and VII differs from those previously described principally in the provision of radially extending spokes having unconnected outer extremities in each of the disks. The load supporting disk 11 of this modification has the usual central opening 15 and securing bolt openings 16. In place of the circumferentially spaced openings 8 provided in the previously described supporting disks, the disk here shown has its periphery cut away at intervals or scalloped to form the radially extending spoke portions 30. The edge of the disk at the sides of the spokes 30 and between them is preferably flanged as indicated at 31. The outer extremities of the spokes 30 are bent laterally to form the axially extending flanges 32.

The outer decorative disk 13, in this form of the invention also has its periphery cut away at spaced intervals to form the substantially U-shaped spokes 33. The spokes 33 terminate at their outer extremities in laterally extending peripheral flanges 34. The spokes 33 are formed of suitable size whereby the side walls thereof snugly engage the spoke portions 30 of the disk 11 when the two disks are assembled as illustrated in Figure VI. When thus assembled the side walls 35 of the spokes 33 engage the flanged portions 31 of the spokes 30 and project therebeyond. Likewise, the laterally extending peripheral flanges 34 of the spokes 33 contact the corresponding flanges 32 of spokes 30.

The two disks are secured together with the radially outermost portions of the spokes contacting as illustrated at 7 and with their central portions spaced axially from each other by means of rivets 29 projecting through each of the flanges 32 and 34 and the base of the rim 10. The side walls 35 of the spokes 33 may be welded to the flanges 31, if desired, to increase the rigidity of the connection between the two disks. The wheel is mounted upon a wheel hub in the usual manner after which any suitable form of hub cap may be inserted in the opening 20 in the disk 13.

The wheel illustrated in Figure VIII is substantially identical in appearance to the wheel shown in Figures VI and VII. In this form of the invention the disks 11 and 13 have their peripheries cut away to form radially extending spoke portions 30 and 33, respectively. Laterally extending flanges 31 and 32 are formed at the sides and ends, respectively, of spokes 30. The spokes 33 are substantially U-shaped having side walls 35 which engage the flanges 31 of spokes 30. The spokes 33 in this form of the invention do not have laterally extending flanges at their outer extremities but terminate in radially extending walls contacting the outer extremity of the radial walls of the adjacent spokes 30.

The disk 11 is preferably secured to the rim 10 by riveting the flanges 32 to the base of the rim in the usual manner. The disk 13 is preferably secured to the disk 11 by welding the side walls 35 of the spokes 33 to the flanged edges 31 of the spokes 30. Any other fastening means may, of course, be utilized if desired, and the outer extremities of spokes 33 may be welded or otherwise secured to the corresponding portion of spokes 30. In any event, the two disks are preferably permanently fastened together with their central portions spaced from each other as illustrated in Figure VIII.

The wheels illustrated in Figures X and XI are identical except for a single feature which will be referred to presently, but differ from the wheels previously described in that the disks 11 and 13 are imperforate except for the central openings 15 and stud bolt openings 16 in disks 11 and the central openings 20 in the disks 13.

Referring to Figure X it will be apparent that disk 11 has a continuous substantially radially extending annular peripheral portion 23 and a substantially flat annular portion 36 radially inwardly thereof. An axially extending flange 18 is formed at the periphery of disk 11. Disk 13 is provided with an axially extending perpiheral flange 21 and a continuous substantially radially extending annular peripheral portion 22 corresponding to flange 18 and portion 23, respectively, of disk 11.

Inwardly of peripheral portion 22, a plurality of radially extending spoke-like ribs 38 are formed in disk 13. Intermediate the ribs 38 are flat depressed portions 39, which preferably are spaced from the portion 36 of disk 11.

In their assembled relation flange 21 and portion 22 of disk 13 contact flange 18 and portion 23, respectively, of disk 11. The disks are preferably rigidly and permanently fastened together with their central portions spaced axially as illustrated by welding the disks at intervals throughout the contacting portions 22 and 23. The disks are secured to the rim 10 by rivets 29 projecting through the base of the rim and flanges 18 and 21 of the disks. If desired, the rivets 29 may form the sole means for fastening the disks together and the welding may be dispensed with.

The construction shown in Figure XI differs from that just described only by the omission of the flange 21 from the periphery of disk 13. In this form of the invention the disks are fastened together by welding or otherwise securing either portion 22 to portion 23 or depressions 39 to portion 36, or both. Disk 11 is secured to the rim 10 by means of the rivets 29 passing through the flange 18 and the base of the rim.

From the foregoing description of the various embodiments of the present invention it will be apparent that this invention provides a wheel comprising a main load supporting disk of relatively heavy construction and a light pressed metal cover disk permanently and rigidly fastened together at their peripheral portions and connected to a rim. It will be understood that the cover disk 13 may be pressed to any desired form and combined with any form of standard load supporting disk 11. While only certain preferred forms of the invention have been shown and described it should be understood that the invention is not limited thereto but is co-extensive with the scope of the appended claims.

We claim:
1. A double disk wheel comprising: an inner load supporting disk and an outer decorative disk having corresponding radially and axially extending peripheral annuli rigidly fastened together at their peripheries with their central portions spaced axially from each other, said disks having circumferentially spaced apart registering openings adjacent their peripheries, the wall of the outer disk about each of the openings therein projecting through the corresponding openings in the inner disk, said inner disk adapted to be demountably attached centrally to a wheel hub, and a rim secured to the periphery of the outer disk.

2. A vehicle wheel comprising a pair of metal disks having corresponding radially and axially extending peripheral annuli positioned with their peripheral annuli in contact with each other and with their central portions spaced axially from each other, said disks having circumferentially spaced registering openings adjacent their peripheries, the wall of the outer disk about each of the openings therein projecting through the corresponding opening in the inner disk and being secured to the axially inner surface of the inner disk, and a rim mounted upon the axially extending peripheral annulus of the outer disk, the rim being secured in position and the two disks being secured to each other by common means.

3. A vehicle wheel comprising a pair of metallic disks having corresponding peripheral annuli arranged with their annuli in contact and with their central portions spaced axially from each other, said disks having circumferentially spaced registering openings adjacent their peripheries, the wall of the outer disk about each of the openings therein projecting through the openings in the inner disk and being secured thereto, said inner disk adapted to be demountably attached centrally to a wheel hub, said outer disk having a large central opening affording access to the inner disk, and a rim secured to the periphery of the outer disk by means also serving to permanently secure the disks to each other.

4. A double disk wheel comprising a pair of metallic disks having corresponding peripheral annuli arranged with the annuli in contact and with the central portions of the disks spaced from each other, said disks having spaced registering openings adjacent their peripheries, the wall of the outer disk about the openings therein projecting through the openings of the inner disk, said inner disk adapted to be demountably attached to a wheel hub, and a rim secured to the periphery of one of said disks.

J HAROLD HUNT.
HARRY J. HORN.